W. H. WARWICK.
Land-Marker.
No. 58,923.
Patented Oct. 16, 1866.
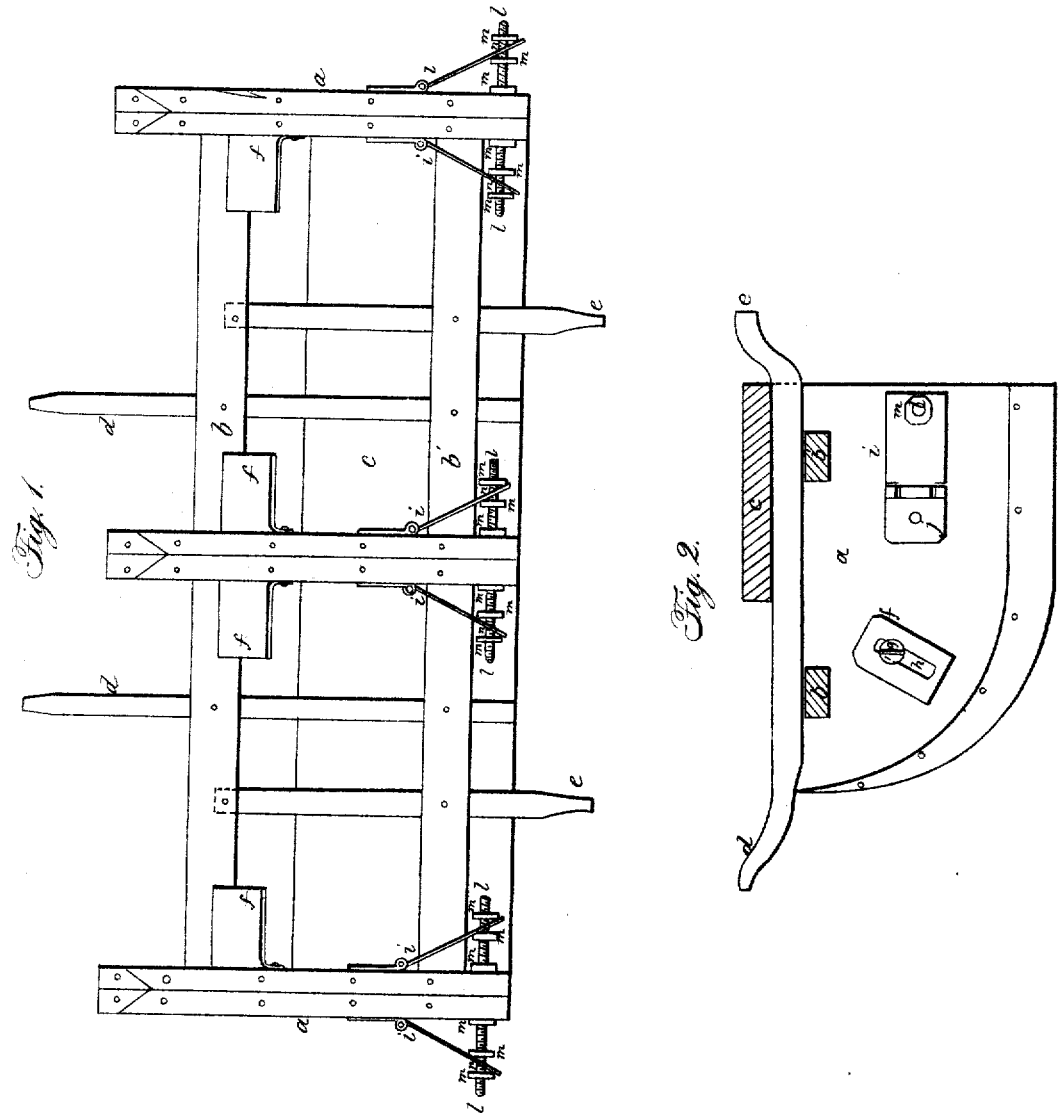
Witnesses:
T Smith
L Jones.
Inventor:
W. H. Warwick
by Atty Thos O. Everett

UNITED STATES PATENT OFFICE.

WILLIAM H. WARWICK, OF DUNLEVY, OHIO.

IMPROVEMENT IN MACHINES FOR FURROWING CORN GROUND.

Specification forming part of Letters Patent No. 58,923, dated October 16, 1866.

*To all whom it may concern:*

Be it known that I, WM. H. WARWICK, of Dunlevy, in the county of Warren and State of Ohio, have invented a certain new and useful Improvement in Machines for Furrowing Corn Ground; and I do hereby declare that the following is a full, clear, and exact description of the construction and operation of the same, reference being had to the accompanying drawings, and to the letters and marks thereon, which said drawings form part of this specification, and, by—

Figure 1 thereof show a bottom view of furrower constructed under my invention, and by Fig. 2, a longitudinal sectional view of the same.

In both of these figures like marks and letters are used to indicate like parts, wherever shown.

This furrower is usually made about eight feet wide, and is intended to form three rows four feet apart, but can be so constructed as to be wider or narrower, and to form the rows nearer to each other or farther apart, if desirable. It is made up of three vertical pieces, $a\ a\ a$, which may be called the "runners," the front surfaces of which, as shown by Fig. 2, are curved upward, beveled, and plated with metal, which beveling and plating continues from the front to the rear end of the runner. These vertical pieces are connected to each other by cross-bars $b\ b'$ and a platform $c$, on which the driver may stand or sit. The front bar, $b$, has attached to it the shafts $d\ d$, and the rear bar, $b'$, the handles $e\ e$.

On both sides of the middle runner and on the inside of the outer runners are fixed slide-guards $f$, which are so attached to the runners as to allow of adjustment, the attaching-screw $g$ being in a slot, $h$, of the guard. Thus connected to the runner, the slide-guards may be moved up or down, and so set as to have the furrower run deep or shallow, as may be required for the furrow.

On the rear end of the runners and on both surfaces thereof are fender-plates $i$, hinged so that the part of the plates extending backward may be adjusted, while the front part of the plates are affixed to the runner by screws $j$, or other appropriate means. Screw-rods $l$ pass through these plates and through the runner, there being binding or jam nuts $m$ on the rods next to the surfaces of the runners and on both sides of the plates, as shown by Fig. 1 of the drawings. The outer or rear portion of the plates may therefore be moved in or out, and thus be securely held, so as to produce a wide or narrow furrow, as may be needed.

This furrower can be used on any kind of ground, smooth or rough, and will not be thrown out of its straight course by stumps or other usual obstacles.

The holes $n$ in the plates through which the rods pass are elongated or widened out, so that the plates may be raised or lowered, as well as moved toward or away from the runners.

Instead of being constructed so as to form three rows of furrows, as is evident, this furrower may be so constructed as to form four or any greater or lesser number of furrows, the several parts thereof being made and arranged and combined substantially as has above been described.

What I claim as my invention, and desire to secure by Letters Patent, is—

1. In combination with the vertical plates or pieces or runners, the slide-guards $f$, for limiting the depth of the furrow, as recited.

2. In combination with said pieces or runners, the fender-plates $i$, constructed and operating substantially as described.

This specification signed this 27th day of June, 1866.

W. H. WARWICK.

Witnesses:
W. H. ROCKHILL,
JOHN BUTLER.